(12) United States Patent
Kinghorn et al.

(10) Patent No.: US 6,377,212 B1
(45) Date of Patent: *Apr. 23, 2002

(54) RADAR APPARATUS EMPLOYING A SIDELOBE BLANKING SYSTEM

(75) Inventors: Anthony Miles Kinghorn; Ronald William Lyon, both of Edinburgh (GB)

(73) Assignee: BAE Systems Avionics Limited, Hampshire (GB)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/676,575

(22) Filed: Jul. 1, 1996

(30) Foreign Application Priority Data

Jul. 7, 1995 (GB) .............................. 9513936

(51) Int. Cl.[7] ........................ G01S 3/16; G01S 13/00; G01S 5/02
(52) U.S. Cl. ................. 342/380; 342/149; 342/427
(58) Field of Search ................ 342/379, 380, 342/381, 427, 149, 152, 153

(56) References Cited

U.S. PATENT DOCUMENTS 3,747,100 A  * 7/1973  Gulick, Jr. ................ 342/380
4,023,172 A     5/1977  Schmidt
4,298,872 A    11/1981  Rodgers ..................... 342/379
4,525,716 A  * 6/1985  Carlin ....................... 342/381
4,549,183 A   10/1985  Farina ....................... 342/149
4,959,653 A    9/1990  Ganz ......................... 342/379
5,030,960 A  * 7/1991  Bartley ...................... 342/427
5,045,858 A  * 9/1991  Eberhardt et al. .......... 342/379

FOREIGN PATENT DOCUMENTS

| EP | 540 249 | 5/1993 |
| GB | 957247 | 5/1964 |
| GB | 1017966 | 1/1966 |
| GB | 1056352 | 1/1967 |
| GB | 1316562 | 5/1973 |
| GB | 2285549 | 7/1995 |

* cited by examiner

Primary Examiner—Gregory C. Issing
(74) Attorney, Agent, or Firm—Crowell & Moring LLP

(57) ABSTRACT

A method and apparatus are provided for determining whether a signal received the main channel (2) of an antenna (1) was incident on the antenna (1) in a direction corresponding to a high gain main lobe. A sidelobe suppression signal is generated from signals received from a other channels at least some of which are derived from elements where output generates the main channel, the signal being categorized as originating from a direction corresponding to the high gain main lobe of the main channel by comparing the value of the signal received on the main channel with that of sidelobe suppression signal.

17 Claims, 2 Drawing Sheets

RADAR APPARATUS EMPLOYING A SIDELOBE BLANKING SYSTEM

BACKGROUND OF THE INVENTION

The present invention relates to radar apparatus and provides a means and method of determining whether a signal received by a main channel, particularly but not exclusively a sum channel, of an antenna of the apparatus has been received from a direction within a high gain main lobe of the antenna or whether it has been received from a direction lying outside the main lobe.

Many radar systems employ highly directional antennas, typically slotted planar waveguide array or phased array antennas, comprising a large number of antenna elements the outputs of which are summed to provide a sum channel output, which output has a characteristic gain pattern comprising a, normally central, main lobe and a number of sidelobes, the sidelobes typically decreasing in amplitude the greater the angle from the main lobe.

In addition to a sum channel, a radar antenna may also have one or more difference channel outputs. These are obtained by separately summing the outputs of the antenna elements in different regions of the antenna, typically four quadrants, and taking the difference between the signal received from two regions. This provides an interferometric technique which can provide an angular discriminant for tracking purposes.

A signal received from a small target in a direction corresponding to the main lobe of a sum channel of an antenna will provide a signal of similar intensity to a larger target in a direction lying outside the main lobe. Therefore it is not possible to use returned signal strength to determine whether a target lies in a direction of the main lobe or not.

The simplest way of determining the direction in which the target lies relative to the antenna is to scan the antenna noting the position of the main lobe when the maximum signal is received, the direction of the main lobe at this instant corresponding to the direction of the target. This however is often impracticable to implement or is ineffective, especially if the apparatus is operating in a mode such that its measurements of range and/or doppler frequency are ambiguous.

Guard antennas are widely used in primary and secondary radar applications to provide a means of distinguishing between main beam and sidelobe radar echoes. Guard antennas are normally relatively small in comparison with the main antenna and have a wide angle beam of substantially uniform gain relative to the main antenna. However guard antennas may sometimes be integral with the main antenna The signals received from the main antenna and guard antenna are compared, FIG. 1 of the attached drawings illustrating a comparison of the relative gain of the two antennas. If the signal received from the main antenna $M(z)$ is greater than the signal received from the guard antenna $G(z)$ then the target must be located in a direction corresponding to the main lobe of the main antenna, and vice versa. This can be expressed as:

> main antenna gain $M(z)$>guard antenna gain $G(z)$=within the main beam main antenna gain $M(z)$<guard antenna gain $G(z)$=outside the main beam where z defines the angle at which the comparison is made.

In practice, conventional antenna configurations typically use a large, high gain main antenna and a small, broad beam wide-angle guard antenna. This type of implementation often provides inadequate $G(z)/M(z)$ gain margin in the region A of the close-in sidelobes of the main antenna, as illustrated in FIG. 2, where the gain of the guard antenna $G(z)$ is less than the gain of the main antenna $M(z)$.

If to overcome the above problem the gain $G(z)$ of the guard antenna is modified such that it has a gain pattern as illustrated in FIG. 3, then while the gain pattern is sufficient such as to ensure the gain of the guard antenna is greater than the gain of the main antenna in the close-in sidelobe regions A, the gain of the guard antenna falls below that of the main antenna in the far-out regions B such that it is not possible to determine from a comparison of the main antenna and guard antenna signals whether a signal has been received in a direction corresponding to the main lobe of the main antenna C or whether that signal has been received from the far-out regions B.

One way in which it has been proposed to overcome this problem is to employ two guard antennas, the first being a small wide-angle antenna having a uniform $G_1(z)$, as illustrated in FIG. 4, and the second, a larger directional antenna, having a gain $G_2(z)$. By summing the power output of the two guard antennas the desired guard antenna gain is achieved, as shown by the broken line in FIG. 4. If the signal received from the main antenna is greater than that of the combined channel of the guard antennas then the signal can unambiguously be classified as having been received in a direction corresponding to the main beam of the main antenna. The problem with this arrangement however is that it is necessary to employ both a small wide-angle guard antenna and also a larger directional guard antenna, substantially increasing the cost of such an arrangement, and often more importantly the bulk of the radar apparatus.

SUMMARY OF THE INVENTION

According to the present invention there is provided radar apparatus comprising an antenna having a plurality of antenna elements from which a plurality of output signals can be derived having different gain characteristics;

means for deriving from a first set of plurality of antenna elements a first output channel having a relatively high gain main lobe;

means for deriving from a second set of the plurality of antenna elements a second output channel having a different gain pattern, at least some of the plurality of antenna elements being common to the first and second sets;

means for deriving one or more further output channels each having a different gain pattern to the first and second output channels; and a discriminator for generating a sidelobe suppression signal from the signals received on the second and one or more further output channels, the discriminator determining that the direction from which a signal is received by the antenna is in the main lobe of the first channel by comparison of the signal received on the first channel with the value of the sidelobe suppression.

The present invention arises from the realisation that channels other than the main channel of an antenna, the difference channel for example, have a high gain in the region corresponding to the relatively high gain sidelobes of the sum channel but have a null on the antenna boresight, the peak of the sum channel response. The difference channel for example can thus be used to provide at least in part the desired sidelobe suppression signal for blanking the sidelobe.

Preferably the antenna comprises a plurality of elements interconnected as a number of arbitrary groups, the output signals from the groups being combined in different manners such as to produce the first and second output channels.

Detailed examination of typical antenna patterns have now shown that the difference channel gain patterns possess the desirable gain margins for generating sidelobe suppression signals on or near the principal or cardinal planes of the antenna, but normally have inadequate gain in regions well off the boresight and in the intercardinal planes. By contrast small low gain guard antennas provide good coverage of sum channel sidelobes in the far-out and intercardinal regions, but generally show inadequate gain margin in the close-in sidelobe regions, and it is preferable that the apparatus further comprises such a guard type antenna having a wide beam relatively uniform gain pattern, the output of which is combined with the output of the second channel to provide the sidelobe suppression signal. This may be done by analogue or digital processing means.

It may be advantageous if the discriminator applies scaling factors to the second output channel and a further output channel to set their relative gains in the most suitable position relative to the first channel.

Depending on the application to which the antenna is put, it may be desirable for the second channel to be a ring difference channel, as this channel particularly possesses the desired gain margins.

Advantageously the antenna comprises a slotted planar waveguide array or phased array antenna consisting of a plurality of elements interconnected such as to define two groups, the output signals of the two groups being summed to obtain a sum channel, and differenced to obtain a difference channel. Preferably the antenna configuration comprises an antenna divided into four quadrants, each quadrant being defined by having a plurality of antenna elements the outputs of which are summed, the apparatus comprising means for generating from the difference in output of two pairs of horizontally separated quadrants an azimuth difference channel, and means for generating from the difference in output of two pairs of vertically separated quadrants an elevation difference channel. Advantageously each channel has a respective receiver associated with it. Alternatively the elevation difference channel and azimuth difference channel may be alternately switched to a common receiver.

According to a second aspect of the present invention there is provided a method of determining whether a signal received by radar apparatus is received from a direction within a high gain main lobe of a first channel of an antenna of the radar apparatus, the method comprising:

deriving a first output channel from a first set of a plurality of elements of the antenna with a relatively high gain pattern having a main lobe;

deriving from a second set of the plurality of elements of the antenna, a second output channel having a different gain pattern, some elements being common to the first and second sets;

deriving one or more further output channels each having a different gain pattern to the first and second output channels;

generating a sidelobe suppression signal, the value of which is determined at least in part from the signal received on the second and one or more further output channels; and determining that the direction from which a signal is received by the antenna is in the main lobe of the first channel by comparison of the value of a signal received on the first channel with the value of the sidelobe suppression signal.

One embodiment of the invention will now be described by way of example only with reference the accompanying drawings, of which:

DETAILED DESCRIPTION

Figure 1:
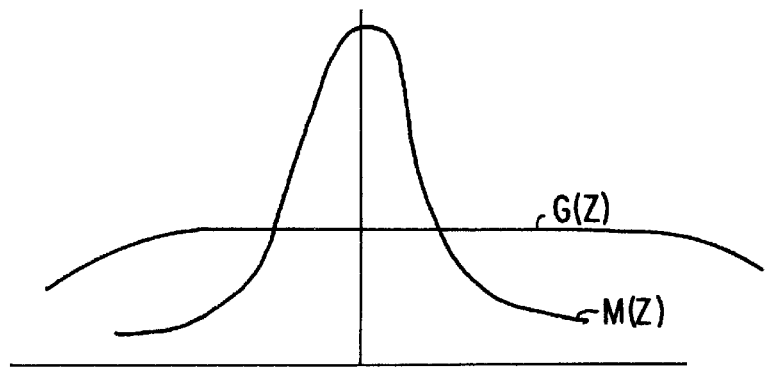
FIGS. 1 to 4 illustrate various gain characteristics of sidelobe suppression signals using known techniques.
Figure 2:
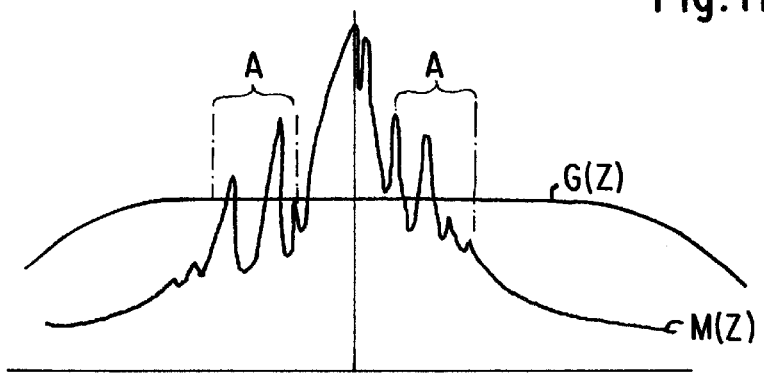
Figure 3:
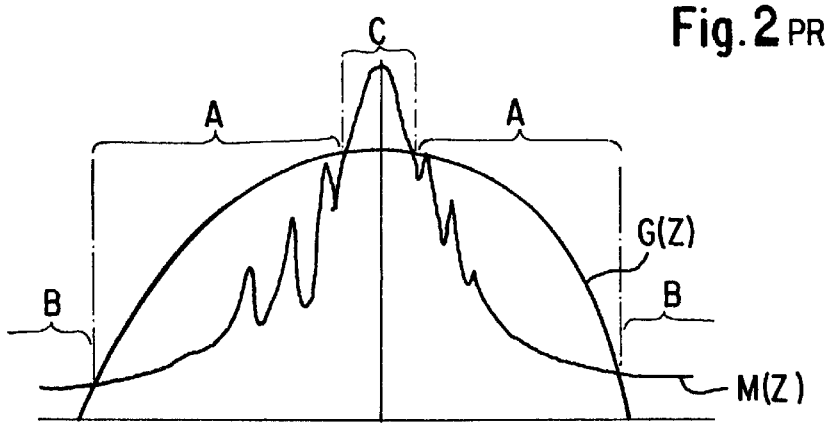
Figure 4:
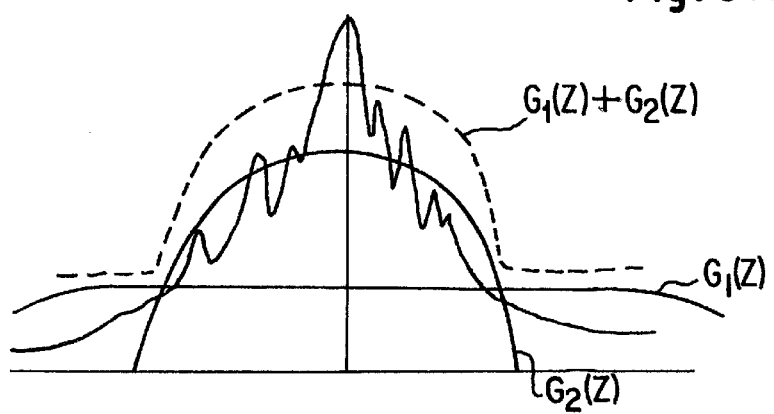
Figure 5:
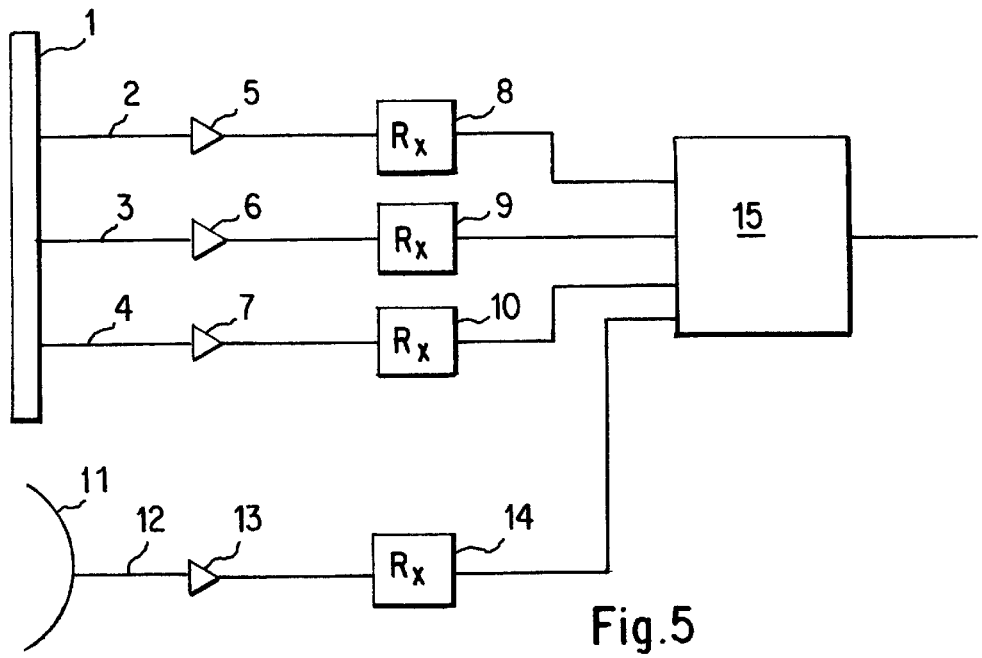
FIG. 5 is a schematic diagram of radar apparatus in accordance with the present invention.

Referring to FIG. 5, there is illustrated radar apparatus comprising a phased array antenna 1 having: a sum channel 2; an azimuth difference channel 3; and an elevation difference channel 4. Each channel has a respective amplifier 5, 6, 7 and receiver 8, 9, 10. The apparatus further comprises a wide-angle guard antenna 11 for providing a guard channel 12 to amplifier 13 and receiver 14. Signals from receivers 8, 9, 10 and 14 are fed into a discriminator 15 which, as described in more detail below, validates that a signal has been received from a direction corresponding to the main lobe of the sum channel antenna.

Figure 6:
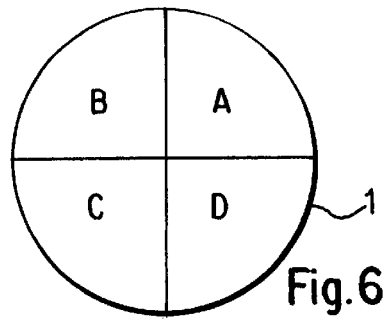
FIG. 6 illustrates the segmentation of the antenna of FIG. 5.

Referring to FIG. 6 there is schematically illustrated the front face of the antenna 1 of FIG. 5. Each of the segments A to D comprises a plurality of antenna elements, the elements of each quadrant being connected to a common output. The outputs from each quadrant are interconnected such as to provide the following channels.

Sum channel S=A+B+C+D

Azimuth difference channel $D_A$=A+D−(B+C)

Elevation difference channel $D_E$=A+B−(C+D).

Figure 7:
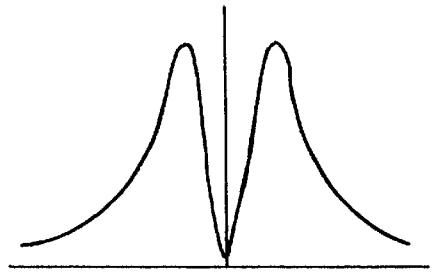
FIG. 7 is a plot of the typical gain characteristics of a ring difference channel of an array antenna along a transverse plane.

In operation, signals received from the azimuth difference channel 3 and elevation difference channel 4 are alternately fed to discriminator 15. In addition the discriminator receives a signal from sum channel 2 and also from guard channel 12. The discriminator 15 generates a ring difference signal by digitally adding the azimuth and elevation difference channel voltage signals in phase quadrature. The gain characteristics of the resultant ring difference channel (in one axis only) are illustrated in FIG. 7.

Figure 8:
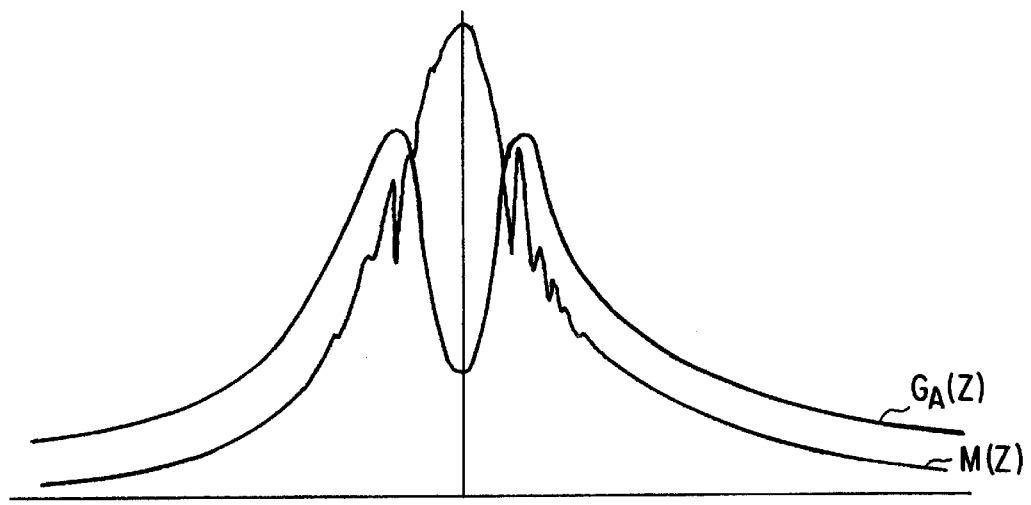
FIG. 8 shows a comparison of the gain characteristics between an augmented guard channel and the sum channel of the main antenna.

The discriminator digitally combines the signal power amplitude of the guard signal from receiver 14 with that of the ring difference signal to provide an augmented guard signal, in effect a sidelobe suppression signal. The gain characteristics of the augmented guard signal $G_1(z)$ compared to the gain characteristics of the main sum channel $M(z)$ are illustrated in FIG. 8. When the signal received from the sum channel receiver 8 is compared with the value of the augmented guard signal, the discriminator determines that the signal has been received by the antenna 1 in a direction within the main lobe of the sum channel of the antenna if the two signals comply with predetermined ratios, or some other similar criteria.

The embodiment illustrated above is given by way of example only but many variations of this apparatus can be made within the scope of the claims appended hereto. In particular, the ring difference signal can be formed before the receivers by adding the elevation and azimuth difference channels in phase quadrature. This could be implemented by the waveguide structure. The power amplitudes of the ring difference channel and guard channel can then be combined after detection by the receivers to form an augmented guard signal. This arrangement allows three receiver channels to be used but may preclude the use of the difference channels for tracking. Another variation may use the azimuth or elevation difference channel alone, possibly selecting the appropriate channel according to circumstances.

We claim:

1. Radar apparatus comprising:
   a slotted planar waveguide array or phased array antenna having a plurality of antenna elements from which a plurality of output signals can be derived which have different gain characteristics;
   means for deriving a first output channel, having a relatively high gain characteristic with a main lobe, from a first set of the plurality of antenna elements;
   means for deriving a second output channel having a gain characteristic different from the gain characteristic of the first output channel, the second output channel being derived from a second set of the plurality of antenna elements, at least some of the second set of antenna elements being common to the first set;
   means for deriving a third output channel having a gain characteristic different from the gain characteristics of both the first and second output channels, the third output channel being derived from a third set of the plurality of antenna elements, at least some of the third set of antenna elements being common to the first set, the second set or both sets;
   a guard antenna having a wide beam of relatively uniform gain which covers far out and intercardinal regions;
   means for deriving a guard antenna output channel which has a gain characteristic different from the gain characteristics of the first, second and third output channels;
   a receiver associated with each output channel, for providing respective first, second, third and guard antenna output signals; and
   discriminator means connected to each receiver for receiving each output signal and for forming a ring difference signal from the second and third output signals, and for combining the ring difference signal with the guard antenna output signal to form a side lobe suppression signal having a gain characteristic derived from the gain characteristics of the second, third and guard antenna output channels, the discriminator determining whether the direction from which a signal is received by the antenna is in the main lobe of the first channel by comparing the first output signal with the side lobe suppression signal.

2. Apparatus as claimed in claim 1, wherein:
   the first set of antenna elements comprises the plurality of antenna elements; and
   the first output channel comprises a sum channel.

3. Apparatus as claimed in claim 2, wherein:
   each of the second and third set of antenna elements respectively comprises antenna elements suitable for deriving azimuth and elevation difference signals;
   the second and third output channels respectively comprise azimuth and elevation difference channels; and
   the second and third output signals respectively comprise azimuth and elevation difference signals.

4. Apparatus as claimed in claim 3, wherein the ring difference signal is formed by adding the azimuth and elevation difference signals in phase quadrature.

5. Apparatus as claimed in claim 1, wherein:
   each of the second and third set of antenna elements respectively comprises antenna elements suitable for deriving azimuth and elevation difference signals;
   the second and third output channels respectively comprise azimuth and elevation difference channels; and
   the second and third output signals respectively comprise azimuth and elevation difference signals.

6. Apparatus as claimed in claim 5, wherein the ring difference signal is formed by adding the azimuth and elevation difference signals in phase quadrature.

7. Apparatus as claimed in claim 1, wherein:
   the antenna comprises four quadrants;
   each of said quadrants has a number of the plurality of antenna elements which are connected to provide a common output; and
   the outputs from each quadrant are summed to provide the first output channel.

8. Apparatus as claimed in claim 7, wherein:
   the means for deriving the second output channel comprises means for generating a difference in output of two pairs of horizontally separated quadrants; and
   the means for deriving the third output channel comprises means for generating a difference in output of two pairs of vertically separated quadrants.

9. Apparatus as claimed in claim 1, wherein the second output channel and the third output channel are alternatively switched to a common receiver.

10. A method of determining whether a signal received by radar apparatus is received from a direction within a high gain main lobe of a first output channel of an antenna of the radar apparatus, the method comprising:
    deriving the first output channel from a first set of a plurality of elements of a slotted planar waveguide array or phased array antenna, the first output channel having a relatively high gain characteristic with a main lobe;
    deriving a second output channel from a second set of the plurality of antenna elements, the second output channel having a gain characteristic different from the gain characteristic of the first output channel, at least some of the second set of antenna elements being common to the first set;
    deriving a third output channel from a third set of the plurality of antenna elements, the third output channel having a gain characteristic different from the gain characteristics of both the first and second output channels, at least some of the third set of antenna elements being common to the first set, the second set or both sets;
    deriving a guard antenna output channel which has a gain characteristic different from the gain characteristics of the first, second and third output channels, the guard antenna output channel having a wide beam of relatively uniform gain which covers far out and intercardinal regions;
    forming respective first, second, third and guard antenna output signals from respective ones of the output channels using receiver means associated with each output channel;
    generating a ring difference signal from the second and third output signals;
    forming a side lobe suppression signal from the ring difference signal and the guard antenna output signal, the side lobe suppression signal having a gain characteristic derived from the gain characteristics of second, third and guard antenna output channels; and determining whether a direction from which a signal is received by the antenna is in the main lobe of the first channel by comparing the side lobe suppression signal with the first output signal.

11. A method as claimed in claim 10, wherein the ring difference signal is formed by adding the second and third signals in phase quadrature.

12. A method as claimed in claim 11, wherein the second and third output signals respectively comprise azimuth and elevation difference signals.

13. A method as claimed in claim 10, wherein the second and third output signals respectively comprise azimuth and elevation difference signals.

14. A method as claimed in claim 10, wherein the side lobe suppression signal corresponds to the complete side lobe region associated with the main lobe of the first output channel.

15. A method as claimed in claim 10, wherein:

the antenna comprises four quadrants;

each quadrant has a number of the plurality of antenna elements which are connected to provide a common output; and the first output channel is formed by summing the outputs from each quadrant.

16. A method as claimed in claim 15, wherein:

deriving the second output channel comprises forming a difference from the outputs of two pairs of horizontally separated quadrants; and deriving the third output channel comprises forming a difference from the outputs of two pairs of vertically separated quadrants.

17. A method as claimed in claim 10, further comprising alternately switching the second and third output channels to a common receiver.

* * * * *